US007661777B2

(12) United States Patent
Ceccarelli et al.

(10) Patent No.: US 7,661,777 B2
(45) Date of Patent: Feb. 16, 2010

(54) DOLLY DROPDOWN BOX DRAWER FOR A TOW TRUCK

(75) Inventors: Charles Ceccarelli, Mountain Home, ID (US); Steven Delaplain, Mountain Home, ID (US); Aaron Martin, Mountain Home, ID (US); Curtis C. Hassell, Jacksonville, OR (US)

(73) Assignee: Rimco, Inc., Mountain Home, ID (US)

( * ) Notice: Subject to any disclaimer, the term of this patent is extended or adjusted under 35 U.S.C. 154(b) by 94 days.

(21) Appl. No.: 10/840,978

(22) Filed: May 7, 2004

(65) Prior Publication Data

US 2005/0248245 A1 Nov. 10, 2005

(51) Int. Cl.
*A47B 88/00* (2006.01)

(52) U.S. Cl. .................................... 312/323; 312/332.1

(58) Field of Classification Search ................. 312/323, 312/322, 332.1, 350; 248/286.1
See application file for complete search history.

(56) References Cited

U.S. PATENT DOCUMENTS

| | | | | |
|---|---|---|---|---|
| 3,032,217 | A * | 5/1962 | Musson et al. | 254/3 R |
| 4,366,997 | A * | 1/1983 | Lopez et al. | 312/332.1 |
| 4,441,771 | A * | 4/1984 | Roesler | 312/322 |
| 4,487,461 | A * | 12/1984 | Tindall et al. | 312/323 |
| 5,209,628 | A * | 5/1993 | Hassell | 414/462 |
| 5,213,401 | A * | 5/1993 | Hatcher | 312/322 |
| 5,290,077 | A * | 3/1994 | Fleming | 292/35 |
| 5,348,207 | A * | 9/1994 | Frank | 312/323 |
| 5,456,468 | A * | 10/1995 | Stringfellow et al. | 312/222 |
| 5,599,079 | A * | 2/1997 | Ranno et al. | 312/323 |
| 5,628,609 | A * | 5/1997 | Nespor | 414/563 |
| 5,957,558 | A * | 9/1999 | Quade | 312/323 |
| 6,257,823 | B1 * | 7/2001 | Kosta | 414/563 |
| 6,611,424 | B2 * | 8/2003 | Huang | 361/685 |
| 6,846,052 | B2 * | 1/2005 | Kelley et al. | 312/208.1 |
| 2004/0130247 | A1 * | 7/2004 | Model | 312/323 |

FOREIGN PATENT DOCUMENTS

| | | | | |
|---|---|---|---|---|
| DE | 4235386 | * | 4/1994 | 312/323 |
| EP | 82219 | * | 6/1983 | 312/323 |

* cited by examiner

*Primary Examiner*—Hanh V Tran
(74) *Attorney, Agent, or Firm*—Charles R. Clark

(57) ABSTRACT

A dolly dropdown box drawer is disposed below a bed or a frame of a tow truck along each side of the truck near a driver's cab for the storage and safeguarding of a pair of towing dollies with one on each side of the truck. Each drawer pulls out laterally and then tilts and arcs downward at the front end of the drawer to provide ready and convenient access to a towing dolly at a level below waist level of a tow truck driver who desires to use the towing dolly during a recovery operation conducted regarding a motor vehicle.

3 Claims, 5 Drawing Sheets

20 24 42 40 10 30 28 86 84 86 26 22 78 76 82 32

87 68 80 88 42 40 102 80 87 32 84 88 38 104 82 84 64 48 56 60 26 34 86 87 100 96 98 77 86 Washer 90 92 94 78 76 72 74

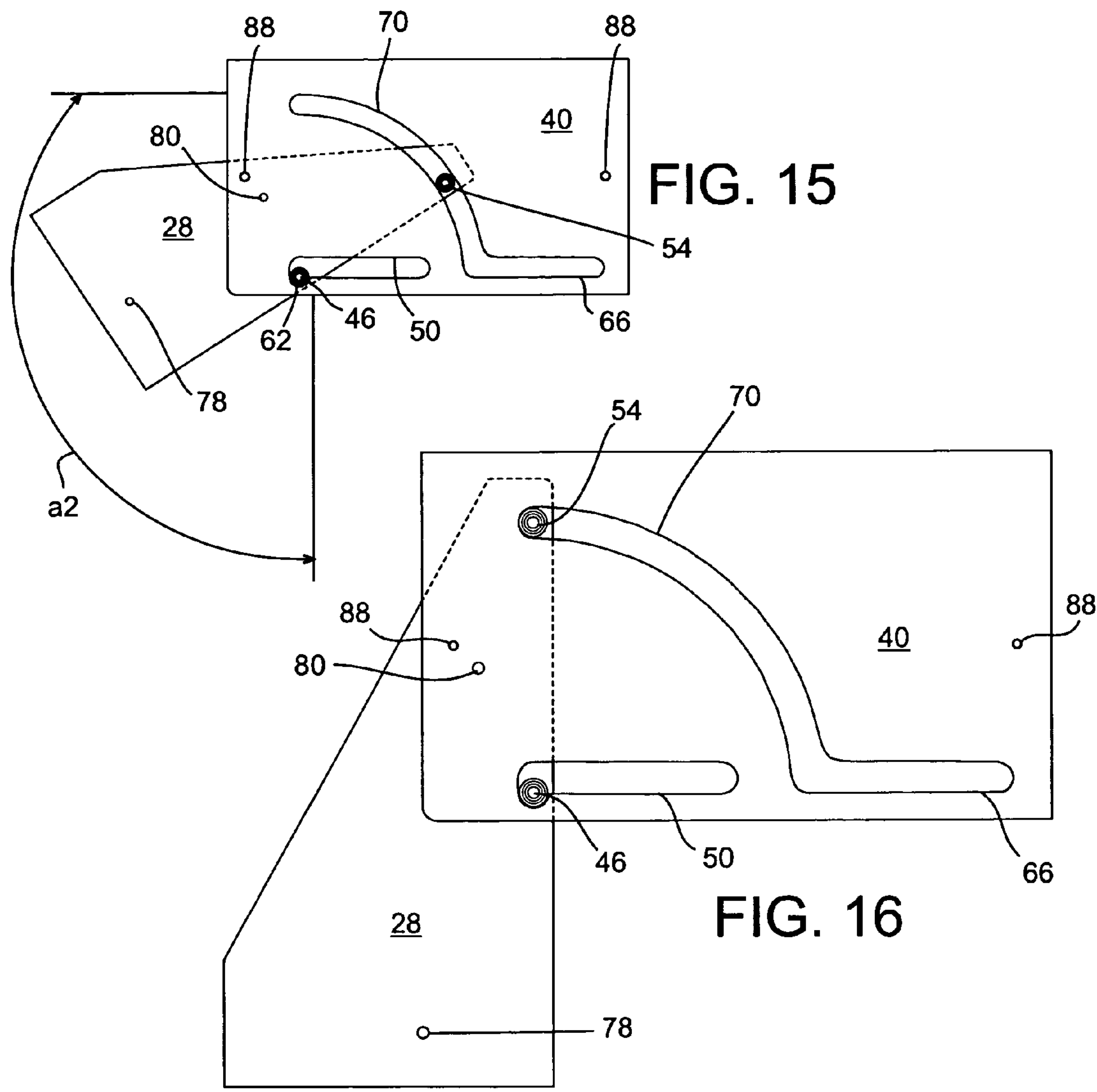
FIG. 15
FIG. 16
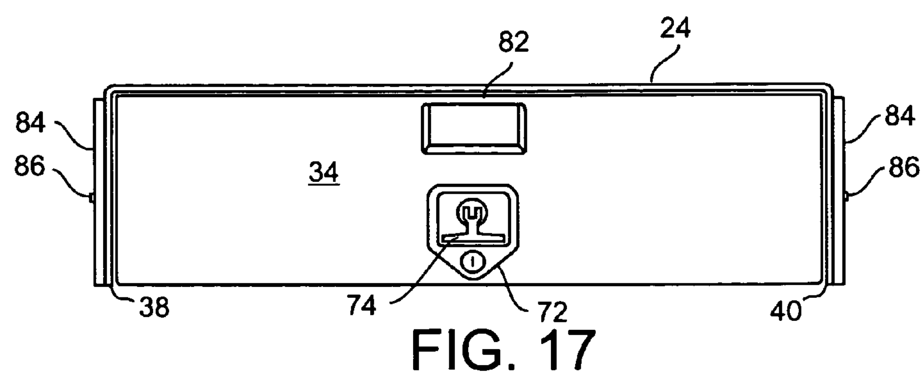
FIG. 17

DOLLY DROPDOWN BOX DRAWER FOR A TOW TRUCK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to a novel dolly dropdown box drawer mounted on a tow truck for the storage and securing of a towing dolly within the drawer. Preferably, a pair of drawers are attached to an underside of a bed or frame of the tow truck. Preferably, each dolly dropdown box drawer includes a lockable latching mechanism that is keyed to permit the locking of the drawer to secure the towing dolly stored within.

BRIEF SUMMARY OF THE INVENTION

An objective of this invention, a dolly dropdown box drawer, is to provide a novel and improved storage apparatus on a tow truck and to facilitate the usage of a pair of towing dollies by storing them lower on the tow truck than is customary in the art. A further object of the invention is to enclose each towing dolly within a dolly dropdown box drawer and thereby protect each towing dolly when not in use from pilferage, weather, road hazards, road debris, and other undesired influences.

Another objective of the invention is to utilize space below a bed or frame of a tow truck that is currently underutilized. Another further object is to present a towing dolly in an open dolly dropdown box drawer advantageously in an orientation ready for use by a tow truck driver. Ergonometric advantages for a tow truck driver are promoted because with the instant dolly dropdown box drawer invention, the driver retrieves a towing dolly from a drawer below waist level rather than at or above waist level. The dolly dropdown box drawer presents a towing dolly in an appropriate orientation for ready use by the driver with a vehicle to be recovered or towed.

The invention helps a tow truck driver safeguard his back and body from injury that in the absence of the invention might be caused by lifting a heavy towing dolly from an inconvenient location on a tow truck.

The dolly dropdown box drawer is preferably made from steel and aluminum plate, angle iron, and rod stock together with appropriate mechanical fittings such as bolts, nuts, washers, bearings, bushings, locks, and rods. Other suitable materials could be substituted in place of steel and aluminum plate, angle iron, and rod stock without departing from the intended scope of the invention.

Additional and various other objects and advantages attained by the invention will become more apparent as the specification is read and the accompanying figures are reviewed.

BRIEF DESCRIPTION OF THE SEVERAL VIEWS OF THE DRAWINGS

FIG. 15 is a partial right end side elevation of a dolly dropdown box drawer frame with a dolly dropdown box drawer assembly within translated laterally and outwardly to a lateral detent depression position from a closed position and with the dolly dropdown box drawer assembly rotating about the axis of a right front track follower assembly resting in a right front track detent depression and a right rear track follower assembly located within a front portion of a right rear track;

FIG. 16 is a right end side elevation of a dolly dropdown box drawer in an open position showing a dolly dropdown box drawer support frame with a dolly dropdown box drawer assembly within translated laterally and outwardly to a lateral detent depression position from a closed position and with the dolly dropdown box drawer assembly rotating about the axis of a right front track follower assembly resting in a right front track detent depression and a right rear track follower assembly arced fully upwardly and forwardly along a front portion of a right rear track; and FIG. 17 is front elevation of a dolly dropdown box drawer in a closed position.

DETAILED DESCRIPTION OF THE INVENTION

Figure 1:
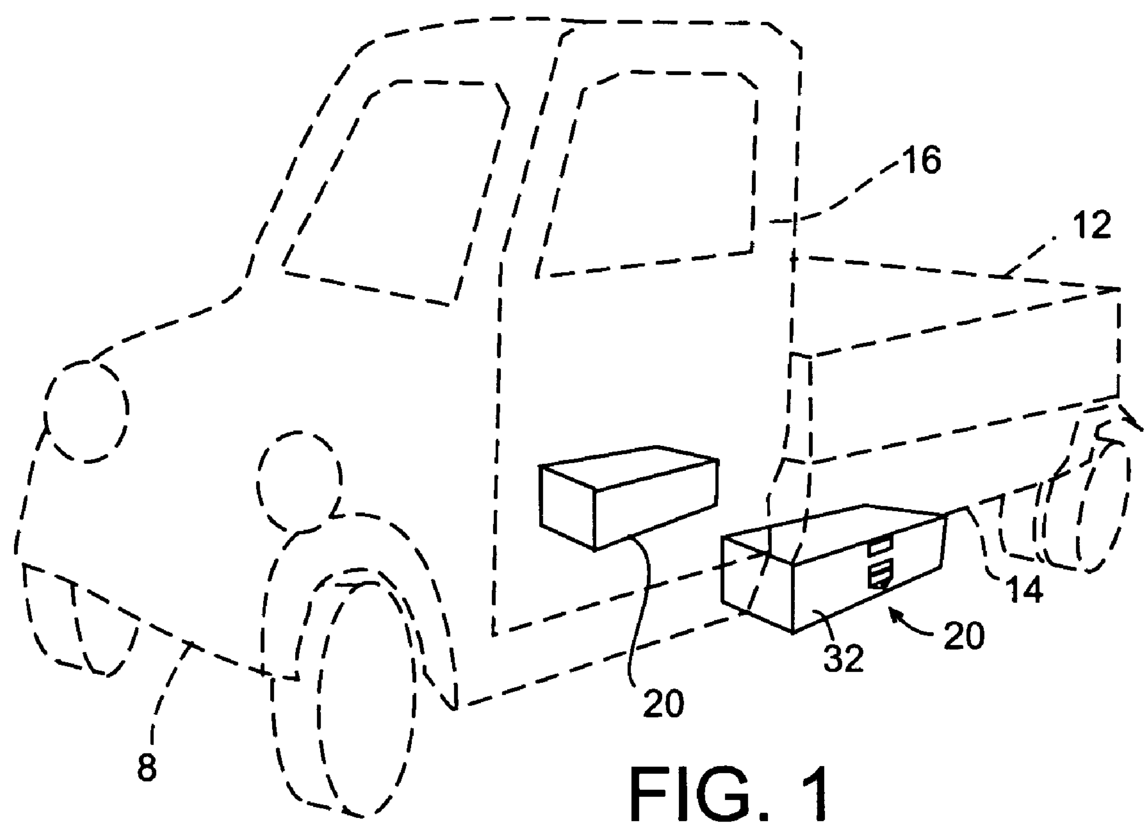
FIG. 1 is a perspective view of a pair of dolly dropdown box drawers disposed under a bed structure of a tow truck.
Figure 2:
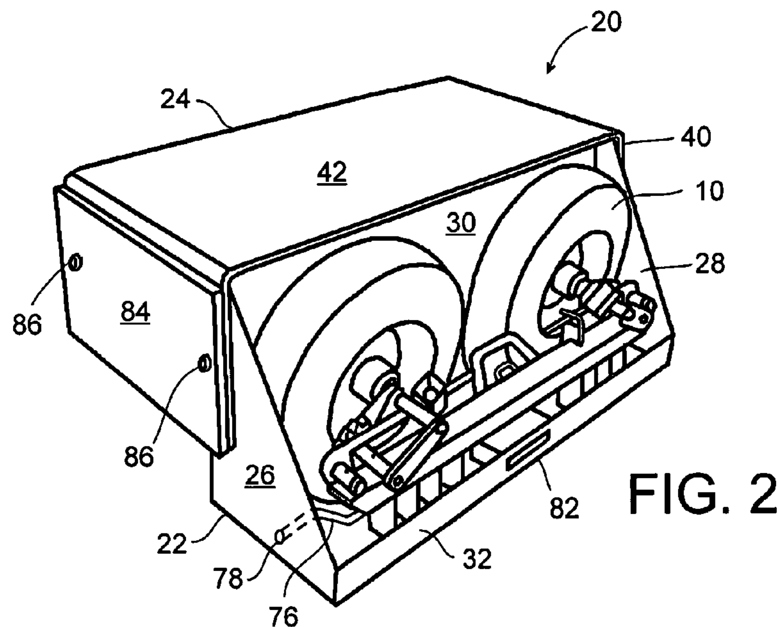
FIG. 2 is a perspective view of a dolly dropdown box drawer in an open position with a towing dolly resting within a dolly dropdown box drawer assembly within a dolly dropdown box drawer support frame.
Figure 3:
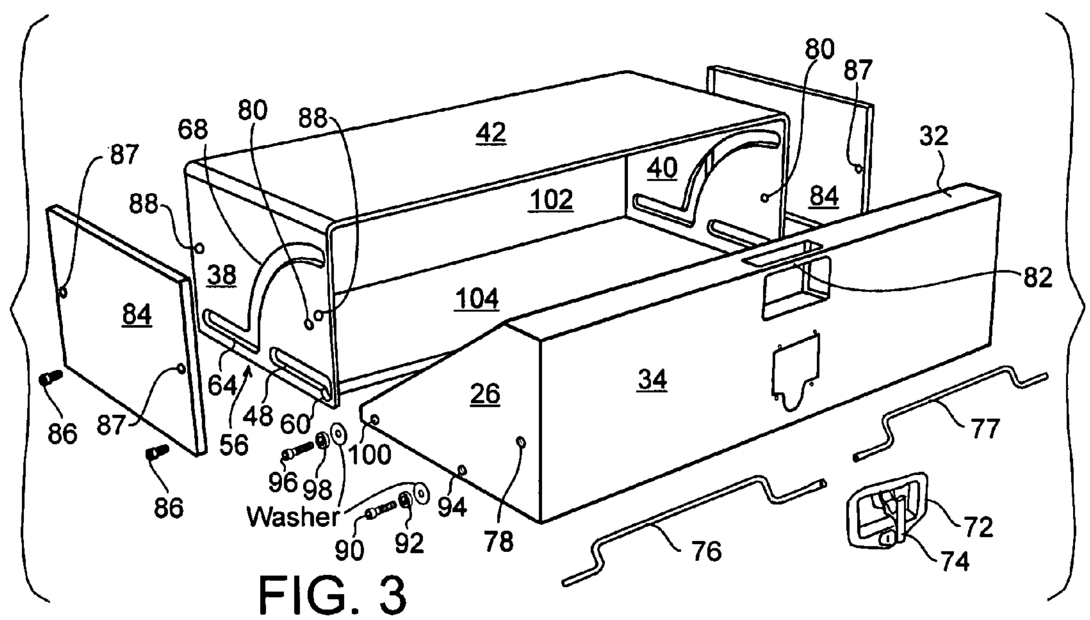
FIG. 3 is an exploded view of a dolly dropdown box drawer.
Figure 4:
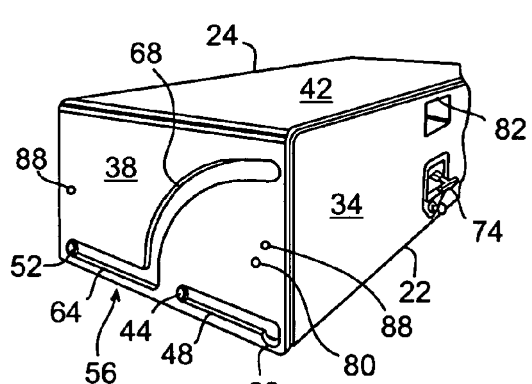
FIG. 4 is a partial perspective fragmentary view of a dolly dropdown box drawer in a closed position with a dolly dropdown box drawer assembly nesting within a dolly dropdown box drawer support frame.
Figure 5:
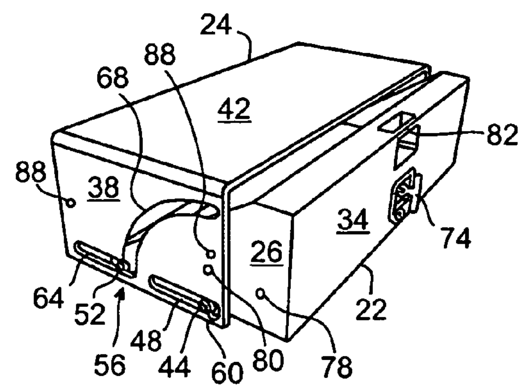
FIG. 5 is a perspective view of a dolly dropdown box drawer in a partially open condition with a dolly dropdown box drawer assembly translated laterally and outwardly from a closed position within a dolly dropdown box drawer support frame.
Figure 6:
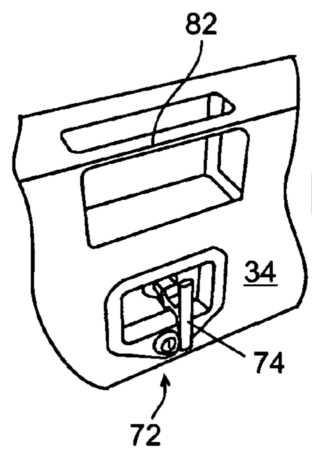
FIG. 6 is a partial perspective fragmentary view of a drawer pull handle and a latching mechanism of a dolly dropdown box drawer assembly.
Figure 7:
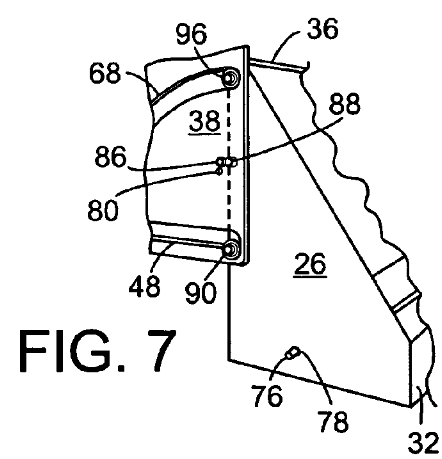
FIG. 7 is a partial perspective view of a dolly dropdown box drawer assembly in an open position within a dolly dropdown box drawer support frame.
Figure 8:
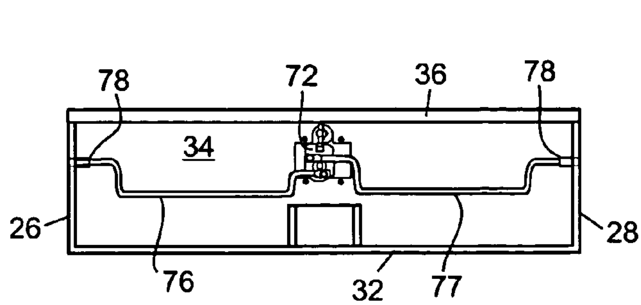
FIG. 8 is an interior view of a dolly dropdown box drawer assembly from above when a dolly dropdown box drawer assembly is in an open position and showing a latching mechanism and two shaped sliding rods.
Figure 9:
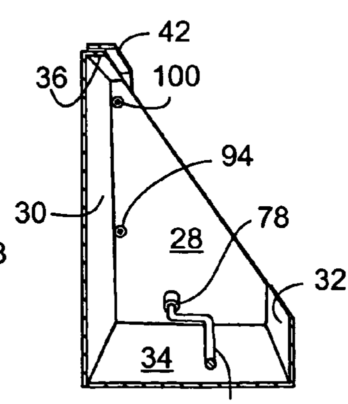
FIG. 9 is an interior, partial perspective view of a right end of a dolly dropdown box drawer with a dolly dropdown box drawer assembly in an open position.
Figure 10:
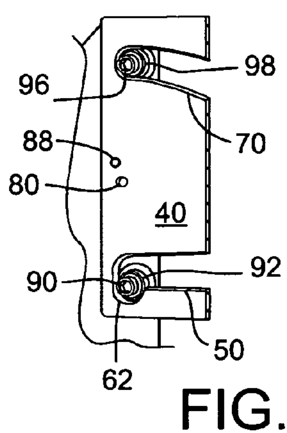
FIG. 10 is a partial perspective view of a support end side wall of a dolly dropdown box drawer support frame with a dolly dropdown box drawer assembly within in an open position with a right front track follower assembly resting in a right front track detent depression and a right rear track follower assembly at the top front of a front portion of a right rear track.
Figure 11:
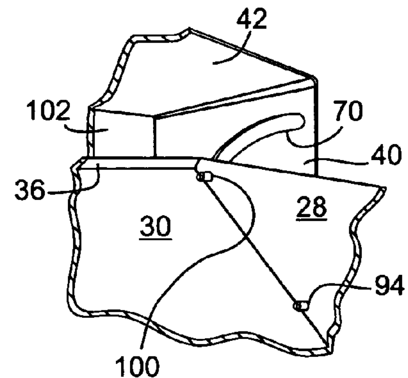
FIG. 11 is an interior, partial perspective view of a right end of a dolly dropdown box drawer with a dolly dropdown box drawer assembly tilting forward within a dolly dropdown box drawer support frame showing a right rear track follower assembly partially translated upwardly along a front portion of a right rear track.

Referring to FIGS. 1 through 17, a tow truck 8 often is equipped with a pair of towing dollies 10 and the tow truck typically includes a bed structure 12 having an underside 14 located behind a driver's cab 16, the present invention is a novel dolly dropdown box drawer 20 that is fastened preferably with nuts and bolts to the underside of the bed structure in proximity to the driver's cab, along the driver's side of the truck, and extending towards the rear of the truck. Preferably a second dolly dropdown box drawer 20 is fastened to the underside 14 of the bed structure 12 in proximity to the driver's cab 16, along the passenger's side of the truck, and extending towards the rear of the truck to comprise a pair of drawers to receive, hold, and store a pair of towing dollies.

The dolly dropdown box drawer 20 comprises a dolly dropdown box drawer assembly 22 supported within a dolly dropdown box drawer support frame 24.

The dolly dropdown box drawer assembly 22 comprises a multiwalled drawer having spaced and opposed drawer side walls 26 and 28, a drawer back wall 30 spaced from and partially opposed by a drawer front wall 32, a drawer bottom wall 34 spaced from and partially opposed by a drawer top wall 36 depending from the drawer back wall.

The dolly dropdown box drawer support frame 24 preferably is made from one piece of rectangular steel plate that is formed with a brake into a pair of spaced and opposed support end side walls 38 and 40 connected by an intermediate top wall portion 42 and with the end side walls depending downward from the intermediate top wall portion.

The dolly dropdown box drawer assembly 22 preferably includes a pair of spaced and opposed front track follower assemblies 44 and 46 that project from the drawer side walls 26 and 28 and are received within and cooperate with a pair of spaced and opposed front tracks 48 and 50 on the support end side walls 38 and 40, respectively, with each front track located towards a lower edge and a front edge of a respective support end side wall.

The dolly dropdown box drawer assembly 22 preferably includes a pair of spaced and opposed rear track follower assemblies 52 and 54 that project from the drawer side walls 26 and 28 and are received within and cooperate with a pair of spaced and opposed rear tracks 56 and 58 on the support end side walls 38 and 40, respectively, with each rear track located towards a lower edge and a back edge of a respective support end side wall.

The front track follower assemblies 44 and 46 are preferably located approximately at a midportion of the dolly dropdown box drawer assembly 22 in proximity to the drawer back wall 30. The front track follower assemblies 44 and 46 preferably are loosely received within the front tracks 48 and 50, respectively, permitting the dolly dropdown box drawer assembly 22 to move relative to the dolly dropdown box drawer support frame 24. The front tracks 48 and 50 are preferably rectangular in shape, thus permitting front track follower assemblies 44 and 46 to move (within front tracks 48 and 50, respectively) forward from a closed position (see FIGS. 1, 4, 12, and 17) to an open position (see FIGS. 2, 7, 9, 10, and 16). Preferably, the front tracks 48 and 50 each has a front track detent depression 60 and 62 with each front track detent depression located towards a front edge of a respective support end side wall.

The rear track follower assemblies 52 and 54 are preferably located at an end portion of the dolly dropdown box drawer assembly 22 in proximity to the drawer back wall 30 and away from the midportion of the dolly dropdown box drawer assembly and the drawer bottom wall 34. The rear track follower assemblies 52 and 54 preferably are loosely received within the rear tracks 56 and 58, respectively, permitting the dolly dropdown box drawer assembly 22 to move relative to the dolly dropdown box drawer support frame 24. The rear tracks 56 and 58 each has a rear portion 64 and 66 preferably each rectangular in shape that each transitions into a front portion 68 and 70 each arcuate in shape, thus permitting rear track follower assemblies 52 and 54 to move (within rear tracks 56 and 58, respectively) forward from a closed position (see FIGS. 1, 4, 12, and 17) along rear portions 64 and 66 to an intermediate position (see FIGS. 5, 13, and 14) and then to arc along front portions 68 and 70 upwardly and forwardly from the intermediate position (see FIGS. 11 and 15) to an open position (see FIGS. 2, 7, 9, 10, and 16). Each rear portion 64 and 66 is linearly aligned with a front track 48 and 50 on a support end side walls 38 and 40, respectively.

When the dolly dropdown box drawer 20 is in a closed position, the drawer bottom wall 34 is substantially in a vertical plane and when the dolly dropdown box drawer 20 is in an open position, the drawer bottom wall 34 is substantially in a horizontal plane (see FIGS. 2, 7, 9, and 16). When a towing dolly 10 is within an open dolly dropdown box drawer 20, the dolly rests on the inner surface of the drawer bottom wall 34. When a towing dolly 10 is within a closed dolly dropdown box drawer 20, the dolly rests on the inner surface of the drawer back wall 30.

As shown in FIGS. 1, 3 to 10, and 12 to 17, the dolly dropdown box drawer 20 can optionally be equipped with a selectively operable conventional latching mechanism 72, having a latching handle mechanism 74 with the latching mechanism fastened to and through the bottom wall 34 in order to secure the drawer in the closed position. Preferably, the latching mechanism 72 includes a pair of shaped sliding rods 76 and 77 that are selectively actuated by the latching mechanism to move horizontally through a pair of rod apertures 78 in the drawer side walls 26 and 28, respectively and into a pair of rod receiving apertures 80 predrilled in the support end side walls 38 and 40, and thereby securing the dolly dropdown box drawer assembly 22 within the dolly dropdown box drawer support frame 24 when in the closed position. The shaped sliding rods 76 and 77 are shaped to allow horizontal movement of the rods by the latching mechanism 72 without physical interference with the movement of the rods by a towing dolly 10 resting in the drawer 20.

The dolly dropdown box drawer 20 can optionally include a drawer pull handle 82 (see FIGS. 1 to 6, and 17) formed into the outer surface of the drawer bottom wall 34 to assist a driver in opening and closing the drawer.

The dolly dropdown box drawer 20 can additionally include a pair of spaced and opposed dolly dropdown box drawer support frame end covers 84 that can each be removably fastened by at least one bolt 86 through at least one corresponding end cover aperture 87 to at least one bolt receiving aperture 88 on the support end side walls 38 and 40, respectively.

Preferably each front track follower assembly 44 and 46 comprises a capscrew 90 that extends through and rotatably retains a ball bearing assembly 92 on the capscrew with the capscrew engaging a front threaded bore 94 in each of the drawer side walls 26 and 28, respectively.

Preferably each rear track follower assembly 52 and 54 comprises a capscrew 96 that extends through and rotatably retains a ball bearing assembly 98 on the capscrew with the capscrew engaging a rear threaded bore 100 in each of the drawer side walls 26 and 28, respectively.

The ball bearing assemblies 92 and 98 make movement of the drawer 20 from a closed position to an open position and the reverse easier. The ball bearing assemblies 92 and 98 roll along respective front tracks 48 and 50 and rear tracks 56 and 58.

The physical configurations of the front tracks 48 and 50 and the rear tracks 56 and 58 on a respective support end side wall 38 and 40 cooperate to preclude the entry of the rear track follower assemblies 52 and 54 into the front portions 68 and 70 until the front track follower assemblies 44 and 46 descend into the front track detent depressions 60 and 62.

Figure 12:
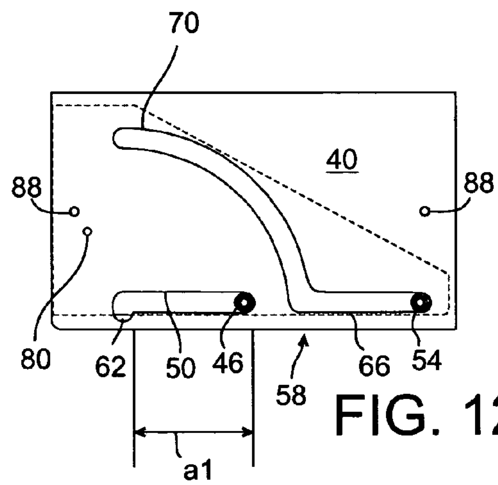
FIG. 12 is a right end side elevation of a dolly dropdown box drawer support frame with a dolly dropdown box drawer assembly within in a closed position.
Figure 13:
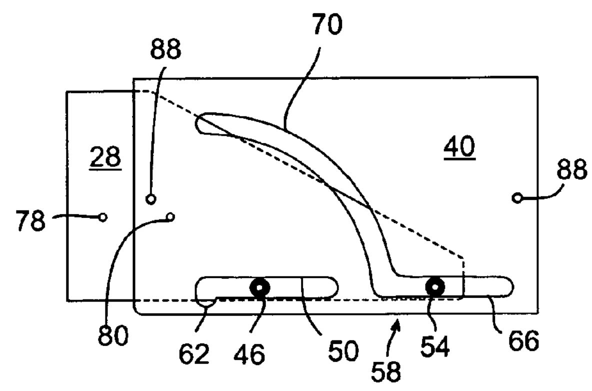
FIG. 13 is a right end side elevation of a dolly dropdown box drawer support frame with a dolly dropdown box drawer assembly within translated laterally and outwardly to an intermediate position from a closed position and towards an open position.
Figure 14:
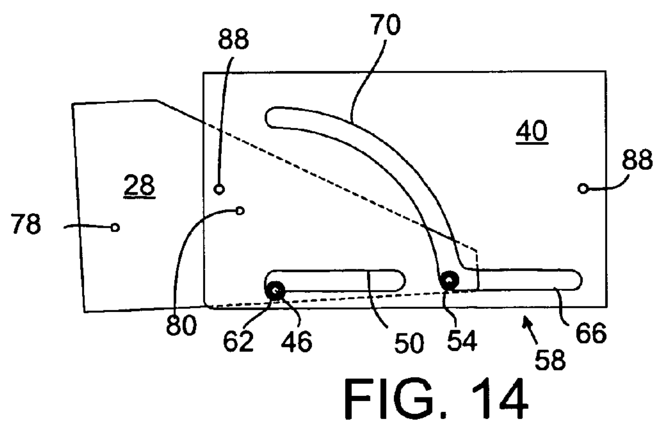
FIG. 14 is a right end side elevation of the dolly dropdown box drawer support frame with a dolly dropdown box drawer assembly within translated laterally and outwardly to a lateral detent depression position from a closed position.

A double headed arrow a1 in FIG. 12 indicates the directions of lateral movement of the dolly dropdown box drawer assembly 22 from a closed position to an intermediate position.

A double headed arrow a2 in FIG. 15 indicates the directions of rotational movement of the dolly dropdown box drawer assembly 22 about the axis of the front track follower assemblies 42 and 44 from an intermediate position to an open position.

The dolly dropdown box drawer support frame 24 may further comprise a support frame back wall 102, the frame back wall depending down from a rear edge of the intermediate top wall portion 42 and bridging between a pair of rear edges of the end side walls 38 and 40.

The dolly dropdown box drawer support frame 24 may further comprise a support frame bottom wall 104 preferably rectangular in shape, the frame bottom wall bridging between a pair of lower edges of the end side walls 38 and 40 and extending forward from the support frame back wall 102 towards a point on each end side wall just before the beginning of the front track detent depressions 60 and 62.

Preferably, the front tracks 48 and 50 and the rear tracks 56 and 58 are cut into the support end side walls 38 and 40 using a computer controlled plasma cutting table.

Alternatively, the front track follower assemblies 44 and 46 may comprise a pair of spaced and opposed pins that project from the drawer side walls 26 and 28.

Alternatively, the rear track follower assemblies 52 and 54 may comprise a pair of spaced and opposed pins that project from the drawer side walls 26 and 28.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they fairly, legitimately and equitably are entitled.

We claim:

1. A dolly dropdown box drawer mounted on a tow truck for the storage and securing of a towing dolly within said drawer comprising a dolly dropdown box drawer assembly supported within a dolly dropdown box drawer support frame;

said dolly dropdown box drawer assembly comprises a multiwalled drawer having spaced and opposed drawer side walls, a drawer back wall spaced from and partially opposed by a drawer front wall, a drawer bottom wall spaced from and partially opposed by a drawer top wall depending from said drawer back wall;

said dolly dropdown box drawer support frame comprising a pair of spaced and opposed support end side walls connected by an intermediate top wall portion and with said end side walls depending downward from said intermediate top wall portion;

a pair of spaced and opposed front track follower assemblies that project from said drawer side walls and are received within and cooperate with a pair of spaced and opposed closed-end slotted front tracks on said support end side walls, respectively;

a pair of spaced and opposed rear track follower assemblies that project from said drawer side walls and are received within and cooperate with a pair of spaced and opposed closed-end slotted rear tracks on said support end side walls, respectively;

said front track follower assemblies are loosely received within said front tracks, respectively, and rear track follower assemblies are loosely received within said rear tracks, respectively, permitting said dolly dropdown box drawer assembly to move relative to said dolly dropdown box drawer support frame;

said front tracks each has a front track detent depression located towards a front edge of a respective support end side wall and said front tracks each terminated at a distance from said front edge of said respective support end side wall;

said rear tracks each has a rear portion each rectangular in shape that each transitions into a front portion each arcuate in shape and said rear tracks each terminated at a distance from said front edge of said respective support end side wall;

each said rear portion is linearly and horizontally aligned with said front track on said support end side wall, respectively, wherein said drawer assembly is supported in a cantilevered horizontal orientation while in a closed position and during transition towards an open position until said front track follower assemblies drop into said front track detent depressions after which said drawer assembly pivots from said horizontal orientation to a vertical orientation, wherein said front and rear track follower assemblies do not leave their respective tracks and remain within the confines of said drawer support frame and wherein the physical configurations of said front tracks and said rear tracks on said respective support end side wall cooperate to preclude the entry of said rear track follower assemblies into said front portions until said front track follower assemblies descend into said front track detent depressions;

a selectively operable conventional latching mechanism, having a latching handle mechanism with said latching mechanism fastened to and through said bottom wall;

said latching mechanism includes a pair of shaped sliding rods that are selectively actuated by said latching mechanism to move horizontally through a pair of rod apertures in said drawer side walls, respectively and into a pair of rod receiving apertures in said support end side walls; and said shaped sliding rods are shaped to allow horizontal movement of said rods by said latching mechanism without physical interference by a towing dolly resting in said drawer.

2. A dolly dropdown box drawer mounted on a tow truck for the storage and securing of a towing dolly within said drawer comprising a dolly dropdown box drawer assembly supported within a dolly dropdown box drawer support frame;

said dolly dropdown box drawer assembly comprises a multiwalled drawer having spaced and opposed drawer side walls, a drawer back wall spaced from and partially opposed by a drawer front wall, a drawer bottom wall spaced from and partially opposed by a drawer top wall depending from said drawer back wall;

said dolly dropdown box drawer support frame comprising a pair of spaced and opposed support end side walls connected by an intermediate top wall portion and with said end side walls depending downward from said intermediate too wall portion;

a pair of spaced and opposed front track follower assemblies that project from said drawer side walls and are received within and cooperate with a pair of spaced and opposed front tracks on said support end side walls, respectively;

a pair of spaced and opposed rear track follower assemblies that project from said drawer side walls and are received within and cooperate with a pair of spaced and opposed rear tracks on said support end side walls, respectively;

said front track follower assemblies are loosely received within said front tracks, respectively, and rear track follower assemblies are loosely received within said rear tracks, respectively, permitting said dolly dropdown box drawer assembly to move relative to said dolly dropdown box drawer support frame;

said front tracks each has a front track detent depression located towards a front edge of a respective support end side wall;

said rear tracks each has a rear portion each rectangular in shape that each transitions into a front portion each arcuate in shape;

each said rear portion is linearly and horizontally aligned with said front track on said support end side wall, respectively, wherein said drawer assembly is supported in a cantilevered horizontal orientation while in a closed position and during transition towards an open position until said front track follower assemblies drop into said front track detent depressions after which said drawer assembly pivots from said horizontal orientation to a vertical orientation within the confines of said drawer support frame and wherein the physical configurations of said front tracks and said rear tracks on said respective support end side wall cooperate to preclude the entry of said rear track follower assemblies into said front portions until said front track follower assemblies descend into said front track detent depressions;

a selectively operable conventional latching mechanism, having a latching handle mechanism with said latching mechanism fastened to and through said bottom wall;

said latching mechanism includes a pair of shaped sliding rods that are selectively actuated by said latching mechanism to move horizontally through a pair of rod apertures in said drawer side walls, respectively and into a pair of rod receiving apertures in said support end side walls; and said shaped sliding rods are shaped to allow horizontal movement of said rods by said latching mechanism without physical interference by a towing doily resting in said drawer;

a pair of spaced and opposed dolly dropdown box drawer support frame end covers;

wherein said dolly dropdown box drawer support frame end covers are each removably fastened by at least one bolt through at least one corresponding end cover aperture to at least one bolt receiving aperture on said support end side walls, respectively.

3. A dolly dropdown box drawer mounted on a tow truck for the storage and securing of a towing dolly within said drawer comprising a dolly dropdown box drawer assembly supported within a dolly dropdown box drawer support frame;

said dolly dropdown box drawer assembly comprises a multiwalled drawer having spaced and opposed drawer side walls, a drawer back wall spaced from and partially opposed by a drawer front wall, a drawer bottom wall spaced from and partially opposed by a drawer top wall depending from said drawer back wall;

said dolly dropdown box drawer support frame comprising a pair of spaced and opposed support end side walls connected by an intermediate top wall portion and with said end side walls depending downward from said intermediate top wall portion;

a pair of spaced and opposed front track follower assemblies that project from said drawer side walls and are received within and cooperate with a pair of spaced and opposed closed-end slotted front tracks on said support end side walls, respectively;

a pair of spaced and opposed rear track follower assemblies that project from said drawer side walls and are received within and cooperate with a pair of spaced and opposed closed-end slotted rear tracks on said support end side walls, respectively;

said front track follower assemblies are loosely received within said front tracks, respectively, and rear track follower assemblies are loosely received within said rear tracks, respectively, permitting said dolly dropdown box drawer assembly to move relative to said dolly dropdown box drawer support frame;

said front tracks each has a front track detent depression located towards a front edge of a respective support end side wall and said front tracks each terminated at a distance from said front edge of said respective support end side wall;

said rear tracks each has a rear portion each rectangular in shape that each transitions into a front portion each arcuate in shape and said rear tracks each terminated at a distance from said front edge of said respective support end side wall;

each said rear portion is linearly and horizontally aligned with said front track on said support end side wall, respectively, wherein said drawer assembly is supported in a cantilevered horizontal orientation while in a closed position and during transition towards an open position until said front track follower assemblies drop into said front track detent depressions after which said drawer assembly pivots from said horizontal orientation to a vertical orientation, wherein said front and rear track follower assemblies do not leave their respective tracks and remain within the confines of said drawer support frame and wherein the physical configurations of said front tracks and said rear tracks on said respective support end side wall cooperate to preclude the entry of said rear track follower assemblies into said front portions until said front track follower assemblies descend into said front track detent depressions;

a pair of spaced and opposed dolly dropdown box drawer support frame end covers;

wherein said dolly dropdown box drawer support frame end covers are each removably fastened by at least one bolt through at least one corresponding end cover aperture to at least one bolt receiving aperture on said support end side walls, respectively.

* * * * *